May 2, 1961    E. E. DASSOW ET AL    2,982,807
BATTERY CONTAINER AND POLARIZING TERMINAL MEANS THEREFOR
Filed Oct. 8, 1957

INVENTORS
EDGAR E. DASSOW
ARNOLD T. TORGERSON
BY *Beale and Jones*

ATTORNEYS

United States Patent Office 2,982,807
Patented May 2, 1961

2,982,807

BATTERY CONTAINER AND POLARIZING TERMINAL MEANS THEREFOR

Edgar E. Dassow and Arnold T. Torgerson, Madison, Wis., assignors, by mesne assignments, to The Electric Storage Battery Company, Philadelphia, Pa., a corporation of New Jersey Filed Oct. 8, 1957, Ser. No. 688,991

4 Claims. (Cl. 136—173)

This invention relates to a battery container and polarizing terminal means therefor. More specifically, this invention relates to a container for a dry cell battery and is provided with terminal means adapted to engage and to derive current from said battery. The terminal means provided distinguishes between the shapes of the center terminal and the bottom terminal of the battery, and engages them selectively whereby regardless of the way in which the batteries are installed the leads from said container are invariably of the proper polarity.

With the development of electronic devices designed for use by the layman and for use with ordinary dry cell batteries, certain problems have arisen. One problem in this area is that for proper function modern electronic equipment using such devices as transistors must be powered by an electric source with its proper polarity connected appropriately into the electronic circuit. The ordinary user of one of these modern devices such as a transistor radio is oftentimes not familiar enough with electricity to install properly such power source in the equipment. In other words, the transistor set owner is often unaware of the fact that the center terminal of an ordinary dry cell is positive while the bottom terminal carries a negative charge. Thus, he is apt to get the battery in backwards, and the set, as a result, will not function properly.

To meet this problem, the present invention provides a battery container adapted for use with transistor radios and the like, said container in combination with terminal means of certain shape to engage selectively the terminals of a dry cell battery no matter which way the battery is installed. By means of a simple wiring circuit old in the art (see U.S. Patent 2,293,354 to Munchow, issued August 18, 1942), the terminal means is connected appropriately into the transistor radio circuit. Thus, it is immaterial whether the person who installs a new set of dry cell batteries into the device installs them in the correct direction.

While the general idea of polarizing terminal means and a battery box in combination therewith has been claimed and disclosed in the prior art, the old devices do not provide sufficient spring mounting means to meet the rough treatment to which modern electric portable devices are subject. Also, the prior art devices are not readily adapted for use in modern electronic equipment since their batteries are not serviceable from without the radio case. Also devices of the prior art are not formed with water-tight or moistureproof constructions to meet requirements of modern usage.

Accordingly, it is an object of this invention to provide a battery holder having in combination therewith polarizing terminal means, said holder having an end opening adapted to be exposed on the outside of modern electronic equipment so that the interior of the equipment need not be opened to install new batteries.

It is another object of this invention to provide a battery holder having polarizing terminal means which is spring mounted to allow the device to absorb mechanical shocks to which modern portable electronic equipment is subject and at the same time to provide good electrical contact between said terminal and the batteries.

It is a further object of this invention to provide a battery container having polarizing terminal means therein and having moistureproof construction.

It is a further object of this invention to provide a battery holder having a polarizing terminal in combination therewith, said battery container being unusually compact and sturdy.

This invention embodies other novel features, details of construction and arrangement of parts which are hereinafter set forth in the specification and claims, and illustrated in the accompanying drawings, wherein:

Briefly, the invention includes the combination of a tubular battery container having one closed end and one open end, the latter adapted to be closed by a closure means. In the closed end is provided a polarizing terminal which is spring mounted. It includes a rectangular bottom terminal contact having struck-up corners adapted to engage only the bottom terminal of the battery; and a headed center terminal contact piece disposed centrally in the bottom terminal contact but insulated therefrom. The inside wall of the closure member carries a second polarizing terminal comprising a button disposed centrally in the closure member and adapted to engage only the center terminal of the battery and fingers about the head and insulated therefrom and adapted to engage only the bottom terminal of the battery. From the polarizing terminal in the closed end of the battery container run contact strips down to recessed studs in the open end of the battery container, said studs adapted to be contacted by arms connected to the contact means on the inside of the closure member when the closure member is installed. Thus the two members adapted to engage the positive terminal of a battery and the two members adapted to engage the negative terminal of a battery are connected together electrically respectively.

Figure 1:
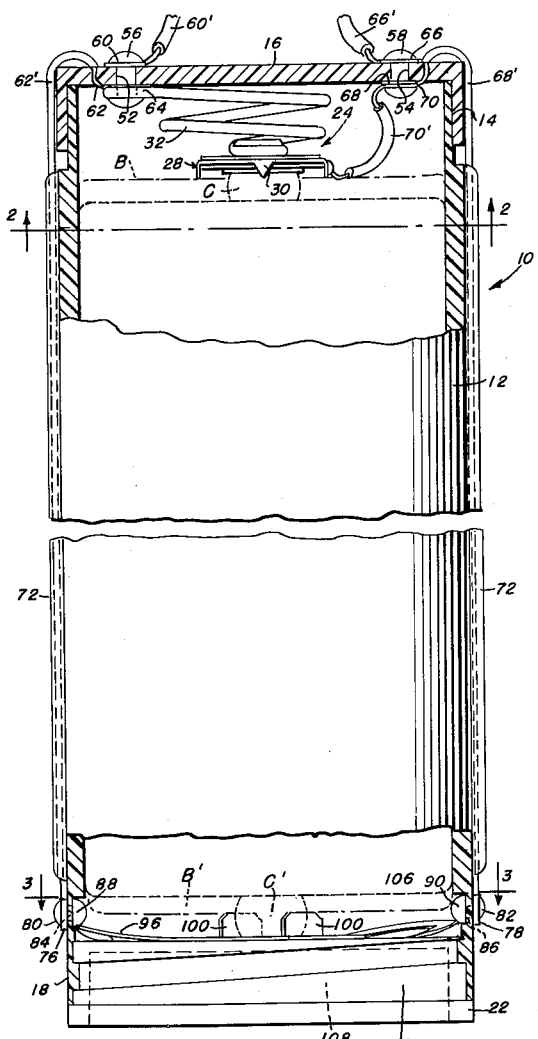
Fig. 1 is an enlarged elevational view partly in section showing the device in use with a dry cell battery in phantom and showing the polarizing terminal means exposed.

Referring more specifically to the drawings, Fig. 1 shows my container designated generally as 10. It comprises a tubular member 12 recessed about one end 14 and receiving there in fixed bond an end cap 16 closing the end. At the opposite end the tubular member 12 is coarsely threaded interiorly in the area 18. Into this threaded area is adapted to be received a correspondingly threaded closure member 20. The closure member is formed with an outwardly extending flange 22, the upper surface of the flange forming a shoulder which abuts the circular end of the tubular member when the closure member 20 is installed.

The tubular member 12, the end cap 16, and the closure member 20 are all preferably molded from a rigid plastic.

Figure 5:
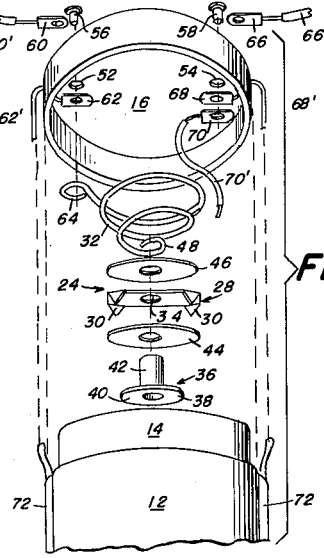
Fig. 5 is a reduced exploded view showing the assembly of a portion of the polarizing terminal means and the upper portion of the battery container.
Figure 6:
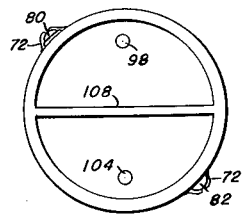
Fig. 6 is a bottom plan view on reduced scale.
Figure 4:
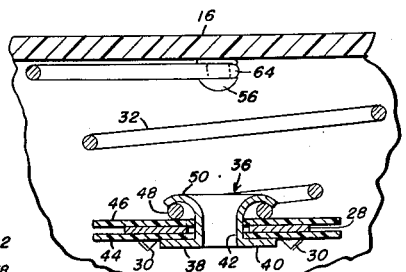
Fig. 4 is an enlarged sectional view taken on the line 4—4 of Fig. 2.

Mounted at the top of the tubular member on the inside wall of end cap 16 is a polarizing terminal 24. It is associated electrically with a polarizing counterpart 26 on the inside wall of the closure member 20. Referring more specifically to the structure of the polarizing terminal 24, it comprises, as shown in Figs. 4 and 5, a rectangular bottom terminal contact piece 28 having its corners 30 struck over to form sharp battery engaging contacts. The ends of these contacts are sharp enough to contact under the pressure of a spring 32 on which the device is mounted, the bottom terminal B of a dry cell battery through any oxide or other non-conductive material which might have formed thereon. The rectangular bottom terminal contact piece 28 has an aperture 34 at its center point. Forming a center terminal contact piece 36 is a grommet member having a head 38, an abutting face 40 adapted to contact the center terminal C of a battery, and a reduced neck portion 42. The piece 36 is of metal. Insulating washers 44 and 46, the inner apertures of which fit snugly about the reduced neck portion 42 of the grommet are provided one on either side of the rectangular bottom terminal contact piece 28. The aperture 34 in the bottom contact terminal piece 28 is slightly larger than the aperture in either of the washers 44 or 46 and the bent-over corners 30 are so spaced as to impinge on the outer periphery of the washer 44. Thus, the washer 44 serves as a spacer member to keep the metallic reduced neck 42 of the grommet spaced from the bottom terminal contact piece 28 and electrically insulated therefrom. The metal spring 32 which mounts the assembly is of substantially conical shape and terminates in a central eye 48 which fits over the end of the reduced neck 42 of the grommet. Completing and securing the assembly, the excess metal 50 of the grommet is crimped over the eye 48 in the spring member 32.

As is shown in Fig. 1, the closed end wall of the end cap 16 has apertures 52 and 54 at diametrically opposed points, the apertures receiving respectively a pair of rivets 56 and 58. The rivet 56 passes through the aperture in a lug 60 on the end of a wire 60' adapted to carry power away from the container. On the inside of the container the rivet extends through the aperture in a second lug 62 on the end of a wire 62' extending through cap 16, and through a second end eye 64 in the center terminal spring 32 (see Fig. 5). Thus, the charge imparted to the contact piece 36 passes through the spring 32 and to various wires.

The rivet 58 passes through an aperture in a lug 66 on a wire 66' also adapted to carry away power to the device with which the container is used. On the inside of the container the rivet 58 passes through an aperture in a lug 68 on a wire 68'. The rivet 58 also passes through an aperture in a lug 70 on the end of a wire 70', the opposite end of which is soldered to the bottom terminal contact piece 28 (see Fig. 1).

Figure 2:
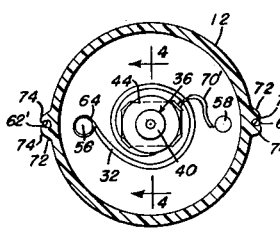
Fig. 2 is a reduced sectional view taken on the line 2—2 of Fig. 1.
Figure 3:
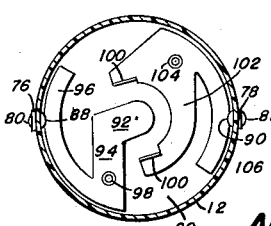
Fig. 3 is a reduced sectional view taken on the line 3—3 of Fig. 1.

The wires 62' and 68' extend longitudinally of the container in diametrically opposed relation and are held securely thereto respectively by two pairs of appropriately spaced plastic runners 72 (see Fig. 2). The runners 72 are molded in the side of the member 12 and each pair present a pair of longitudinally running lips 74 into which the respective wires are received in snap installation. Near the open end of the container the wires terminate in lugs 76 and 78 suitably apertured and receiving respectively rivets 80 and 82 which extend through appropriate openings 84 and 86 at diametrically opposed points in the case near the threaded area 18. The rivets each have two heads; one on the outside of the container and one on the inside, the latter 88 and 90 being in a recessed portion of the threaded area 18. The rivets are, of course, metallic. As shown in Figs. 1 and 3, the polarizing terminal 26 carried on inner wall of the closure member 20 comprises a central substantially circular center terminal contact button 92 disposed flat thereagainst and having an angular extension 94 from which a curved spring contact arm 96 extends along the side of the closure member. The center terminal button 92, the angular extension 94, and the arm 96 are of one metal stamping and are secured to the inner face of the closure member by a rivet 98. The spring arm 96 is raised slightly above the inner surface of the closure member 20 (see Fig. 17) so that it makes spring contact with an electric stud comprising the inner head 88 of the rivet 80. Adapted to contact the bottom terminal of a dry cell battery are the upwardly extending fingers 100 disposed in the closure member 20 on opposite sides of the button 92. The fingers 100 extend upwardly from a base plate 102 of substantially U-shape secured to the closure member 20 by rivet 104 and having extending therefrom a second spring arm 106 similar in configuration to the first spring arm 96 and disposed about the side of the closure member 20. The spring arm 106 similar to spring arm 96 is bent slightly upward away from the closure member 20 to resiliently engage the electric stud 90 comprising the inner head of the rivet 82.

The threaded area 18 in the open end of the tubular container and the threaded area of the closure member 20 each have only one thread so that when the closure member is turned home the spring contact arms 76 and 106 can only respectively contact the studs 88 and 90. Thus, there is no chance of reversing the contacts 92 and 100 of the closure member 20 which must be connected electrically respectively to contact members 36 and 30. To facilitate turning the closure member home, the outer end thereof is recessed cylindrically and a diametrically disposed turning web 108 is rigidly provided therein.

The operation of the combined battery container and depolarizing terminal of the invention will be obvious from the drawings. When it is associated with electronic equipment, the container of the invention has the closure member 20 in the wall of the equipment so that batteries can be replaced from outside the equipment. Tubular member 12 extends within the equipment. To install new batteries, it is merely necessary to remove the end closure 20 by unscrewing it and to insert the new battery with cells all facing the same direction. If the battery is put bottom end first, the bottom end contact B will abut the ends of the struck up corners 30 and make electrical contact therewith. A negative charge will then exist in the wires 70' and 66'. Head 40 will not contact the battery because the headed member 36 does not extend out as far the points 80. After the last battery is installed, the closure member may be inserted and screwed home. The center terminal C' of the last battery will contact the button 92. The fingers 100 will make contact with no part of the battery as the height of the center terminal C' of the battery is sufficient to space the remainder of the battery away from the fingers. The button 92 will thus be imparted the positive charge of the center terminal C and the charge will be carried through the angular extension 94 through spring arm 92 through the electric stud 88 to the wire 62' and 60' and ultimately to the powered equipment.

If on the other hand the battery is installed in the container top end first, the center terminal C will abut the headed member 36 and impart a positive charge therethrough through the spring 32 to the positive wire 60' and ultimately to the powered device. The bottom terminal B' of the battery will contact the top edge of the fingers 100 after the closure member 20 is screwed home. Button 92 will not touch the battery. The fingers 100 will receive a negative charge which will be in turn supplied through the U-shaped member 102 through spring arm 106 and through the electric stud 90 to the wires 68' and 66' and ultimately to the power source.

As a result of the structure of the present invention, no matter which way the battery is installed in the container 10 wire 60' will always carry the charge of the center terminal and wire 66' will always carry the charge of the bottom terminal of the dry cell battery. While hereabove it has been considered that the center terminal is positive and the bottom terminal is negative, thus making wire 60' positive and wire 66' negative, obviously if the internal arrangement of the battery is reversed reversing terminal polarity, and the outer battery structure remains the same, there will be a reversing of the polarity of the wires 60' and 66'. More obviously, a change in nomenclature of the polarity of the battery terminals will result in the expected change in the nomenclature of the polarity of the wires 60' and 66'.

The present invention will be invaluable when used with modern portable electronic equipment. The provision of the single end access with threaded closure 20 not only makes the batteries readily accessible from without the electronic equipment if installed as described above, but also insures moistureproof disposition of the batteries. The device is designed to withstand great mechanical shocks and still keep contact with the battery terminals by virtue of the spring mounting 32 of the polarizing means.

While this invention has been shown in but one form, it is obvious to those skilled in the art, that it is not so limited but is susceptible of various changes and modifications without departing from the spirit and scope of the claimed invention.

We claim:
1. A battery enclosure and polarizer comprising a watertight tubular container having one end wall that is fixedly mounted and one end wall that is removable, said container being adapted to house a dry cell battery, a coil spring extending along the axis of the container and having one of its ends secured to one end wall of said container, a first polarizing terminal secured to the distal end of said coil spring and facing the other end wall of the container, said polarizing terminal including a bottom-terminal-contact piece comprising a plate having an opening therein and at least one upstanding corner directed toward the said other end of the container, and a center-terminal-contact piece comprising a metallic head and a neck passing through the opening in said plate in a direction toward the said one end wall and engaging said coil spring, said bottom-terminal-contact piece and said center-terminal-contact piece being electrically insulated from each other by a washer surrounding said neck between the head and the plate, the distal end of said corner extending beyond said head in a direction toward the said other end wall; a second polarizing terminal being mounted on the said other end wall and comprising a center-terminal-contact button disposed centrally of the said other end wall and a bottom-terminal-contact finger disposed eccentrically of the said other end wall and extending in a direction toward the said one end wall beyond said button, said button and said finger being electrically insulated from each other, a pair of fixed radially inward extending studs secured to the tubular wall of the container adjacent the removable end wall thereof, a pair of spring contact arms mounted on said removable end wall and having portions spaced in a direction toward the fixedly mounted end wall from said removable end wall, means connecting electrically said spring arms respectively to the terminal contact means of the polarizing terminal mounted on the removable end wall and means electrically connecting said studs respectively to the terminal contact means of the polarizing terminal mounted on the fixedly mounted end wall, whereby when the removable wall is installed in the end of said tubular container the spring arms butt against said studs respectively in a direction axial of said container to establish sure electrical circuit between the corner and the finger and between the head and the button respectively to polarize such dry cell battery within the container.

2. A battery enclosure and polarizer comprising a watertight tubular container having one end wall that is fixedly mounted and one end wall that is removable, said container being adapted to house a dry cell battery, a coil spring extending along the axis of the container and having one of its ends secured to the fixedly mounted end wall of said container, a first polarizing terminal secured to the distal end of said coil spring and facing the removable end wall of the container, said polarizing terminal including a bottom-terminal-contact piece comprising a plate having an opening therein and at least one upstanding corner directed toward the said removable end wall of the container, and a center-terminal-contact piece comprising a metallic head and a neck passing through the opening in said plate in a direction toward said fixed end wall and engaging said coil spring, said bottom-terminal-contact piece and said center-terminal-contact piece being electrically insulated from each other by a washer surrounding said neck between the head and the plate, the distal end of said corner extending beyond said head in a direction toward said removable end wall; a second polarizing terminal being mounted on the removable end wall and comprising a center-terminal-contact button disposed centrally of the removable end wall, and a bottom-terminal-contact finger disposed eccentrically of the removable end wall and extending in a direction toward said fixedly mounted end wall beyond said button, said button and said finger being electrically insulated from each other, a pair of fixed radially inward extending studs secured to the tubular wall of the container adjacent the removable end wall thereof, a pair of spring contact arms mounted on said removable end wall and having portions spaced in a direction toward the fixedly mounted end wall from said removable end wall, means connecting electrically said spring arm respectively to said button and said finger, and means connecting electrically said studs respectively to said head and said corner, whereby when the removable wall is installed in the end of said tubular container the spring arms butt against said studs respectively in a direction axial of said container to establish sure electrical circuit between the corner and the finger and between the head and the button respectively to polarize such dry cell battery within the container.

3. A battery enclosure and polarizer as described in claim 2 wherein the tubular wall of said container is formed with a pair of side-by-side resilient runners extending longitudinally of said container and said means connecting electrically said studs respectively to said head and said corner comprises an elongated metallic member held in snap installation between said runners.

4. A battery enclosure and polarizer as described in claim 2 wherein said removable end wall is exteriorly threaded and the tubular wall of said container is interiorly threaded and said removable end wall in installation threadedly engages in said tubular wall.

References Cited in the file of this patent
UNITED STATES PATENTS

| | | |
|---|---|---|
| 281,097 | McGinnis | July 10, 1883 |
| 1,879,595 | Voorhees | Sept. 27, 1932 |
| 1,879,623 | Jones | Sept. 27, 1932 |
| 2,293,354 | Munchow | Aug. 18, 1942 |
| 2,366,929 | Pfeil | Jan. 9, 1945 |
| 2,612,539 | Dyer | Sept. 30, 1952 |